United States Patent Office.

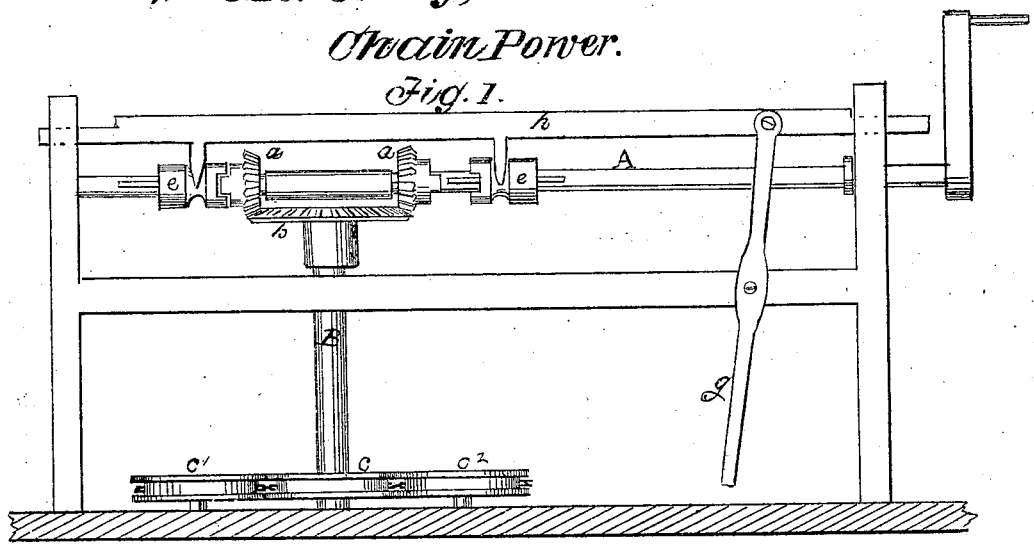
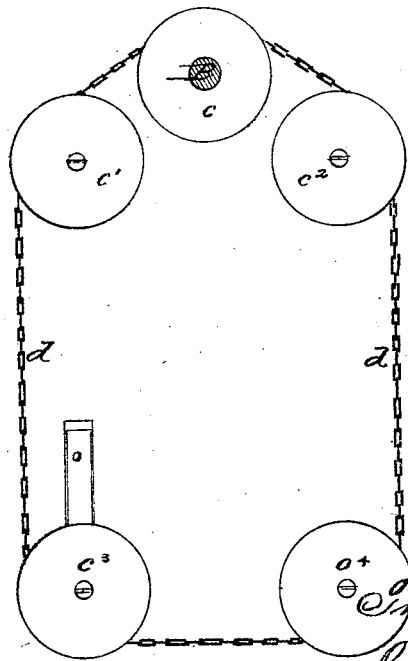
PATENTED JAN 7 1868

WILLIAM McCREERY, OF PITTSBURG, PENNSYLVANIA.

Letters Patent No. 73,191, dated January 7, 1868.

IMPROVEMENT IN ENDLESS-CHAIN POWER.

*The Schedule referred to in these Letters Patent and making part of the same.*

TO ALL WHOM IT MAY CONCERN:

Be it known that I, WILLIAM McCREERY, of Pittsburg, in the county of Allegheny, and State of Pennsylvania, have invented new and useful Improvements in Endless-Chain Reversible Power for Drawing Cars, &c.; and I do hereby declare that the following is a full, clear, and exact description thereof, which will enable those skilled in the art to make and use the same, reference being had to the accompanying plate of drawings, and to the letters of reference marked thereon, forming part of this specification.

Figure 1 represents an end elevation of my invention.

Figure 2 is a sectional top view.

Similar letters of reference indicate corresponding parts.

The object of this invention is to move cars, boats, vessels, or other heavy or light bodies in either direction, in depots, stores, houses, locks, docks, or other places, by steam, water, or any other power, by attaching a reversible gear to be connected when required with the body or bodies to be moved.

A represents a main shaft, connected with a stationary engine, on which are placed loosely two small bevel-gears, $a$ $a$, facing each other, and engaging opposite sides of a large horizontal bevel-wheel, $b$, fixed on a vertical shaft, B, at the foot of which is a pulley, $c$, carrying an endless chain, $d$ $d$, that passes over a train of pulleys, $c^1$ $c^2$ $c^3$ $c^4$, to be placed at points or distances apart, which may be required for operating the chain in moving cars, or any other object to which it may be attached. The chain $d$ $d$ is reversed in its operation by two shifting-clutches, $e$ $e$, on the main shaft A, on opposite sides of the large wheel $b$, to engage and disengage the small bevels $a$ $a$ simultaneously, the clutches being moved in and out of the bevels $a$ $a$, on the opposite sides, at the same time, by a lever, $g$, which works a sliding bar, $h$, connected with the clutches. It will be seen that when the clutches are shifted, the motion of the bevel-wheel $b$ will be reversed, while the main shaft runs in the same direction, and then the endless chain can draw a car or other object attached to it in or out of a house, &c., or from one point to another, readily. The driving-shaft thus continues in motion without interference with other machinery connected therewith.

Having thus described my invention, I claim as new, and desire to secure by Letters Patent—

The arrangement of the shifting-clutches $e$ $e$, the bevels $a$ $a$ and $b$, the pulleys $c$ $c^1$ $c^2$ $c^3$ $c^4$, and the endless chain $d$ $d$, when applied as and for the purposes herein described.

WILLIAM McCREERY.

Witnesses:
PETER DRESSLER,
SAMUEL H. LONG.